(12) United States Patent
Forster et al.

(10) Patent No.: US 9,328,467 B2
(45) Date of Patent: May 3, 2016

(54) ROTOR HOOD FOR MILLING APPARATUS

(75) Inventors: Johannes Forster, Saberhausen (DE); Peter Erdmann, Emmelshausen (DE); Walter Mayer, Boppard (DE); Udo Lohse, Strassenhaus (DE); Siegfried Schwarz, Masterhausen (DE)

(73) Assignee: BOMAG GmbH, Boppard (DE)

( * ) Notice: Subject to any disclaimer, the term of this patent is extended or adjusted under 35 U.S.C. 154(b) by 0 days.

(21) Appl. No.: 13/884,046

(22) PCT Filed: Nov. 9, 2011

(86) PCT No.: PCT/EP2011/005619
§ 371 (c)(1),
(2), (4) Date: Aug. 15, 2013

(87) PCT Pub. No.: WO2012/062456
PCT Pub. Date: May 18, 2012

(65) Prior Publication Data
US 2013/0322963 A1    Dec. 5, 2013

(30) Foreign Application Priority Data

Nov. 9, 2010  (DE) .......................... 10 2010 050 831

(51) Int. Cl.
| | |
|---|---|
| *E01C 19/00* | (2006.01) |
| *E01C 23/06* | (2006.01) |
| *A01B 33/12* | (2006.01) |
| *E01C 23/088* | (2006.01) |
| *E02F 3/24* | (2006.01) |
| *E02F 3/78* | (2006.01) |
| *F41H 11/26* | (2011.01) |

(52) U.S. Cl.
CPC ............ *E01C 23/065* (2013.01); *A01B 33/125* (2013.01); *E01C 23/088* (2013.01); *E02F 3/241* (2013.01); *E02F 3/783* (2013.01); *F41H 11/26* (2013.01)

(58) Field of Classification Search
None
See application file for complete search history.

(56) References Cited

U.S. PATENT DOCUMENTS

| | | | |
|---|---|---|---|
| 4,458,763 A | 7/1984 | Rao et al. | |
| 5,893,677 A * | 4/1999 | Haehn et al. | ..................... 404/90 |
| 8,177,456 B2 * | 5/2012 | Haroldsen | ....................... 404/94 |

FOREIGN PATENT DOCUMENTS

| | | |
|---|---|---|
| DE | 20 2008 016 935 U1 | 7/2010 |
| FR | 2 866 909 A1 | 9/2005 |
| SU | 562230 A1 | 6/1977 |

OTHER PUBLICATIONS

The International Bureau of WIPO, International Preliminary Report on Patentability, International Application No. PCT/EP2011/005619, Date of Issue May 14, 2013 (6 pages).

(Continued)

*Primary Examiner* — Thomas B Will
*Assistant Examiner* — Katherine Chu
(74) *Attorney, Agent, or Firm* — Wood, Herron & Evans, LLP

(57) ABSTRACT

The present invention relates to a rotor hood for a milling apparatus, with a front hood part, a rear hood part and two side hood parts, the front and the rear hood part enclosing together with the two side hood parts a working space that is open at the bottom, further comprising a stripping device which is mounted on the rotor hood and which forms the rear lower edge of the rotor hood in the working direction. The present invention further relates to a construction machine with a milling apparatus and such a rotor hood and a method for operating a milling apparatus with a rotor hood.

16 Claims, 4 Drawing Sheets

(56) References Cited

OTHER PUBLICATIONS

The International Bureau of WIPO, English Translation of International Preliminary Report on Patentability, International Application No. PCT/EP2011/005619, Date of Issue May 14, 2013 (8 pages).
WPI/Thomson, English Abstract of SU562230, retrieved from c:\EPOPROGS\SEA, XP-002667999, retrieved on Jan. 30, 2012 (1 page).
Espacenet, English Machine Translation of FR2866909A1, retrieved from http://worldwide.espacenet.com, retrieved on May 6, 2013 (10 pages).
Espacenet, English Machine Translation of DE202008016935U1, retrieved from http://worldwide.espacenet.com, retrieved on May 6, 2013 (10 pages).
Espacenet, English Translation of main claim of DE202008016935U1, May 6, 2013 (2 pages).
European Patent Office, International Search Report and Written Opinion of the International Searching Authority, International Application No. PCT/EP2011/005619, mailed Mar. 22, 2012 (9 pages).
European Patent Office, English Translation of the International Search Report, International Application No. PCT/EP2011/005619, mailed Mar. 22, 2012 (3 pages).

\* cited by examiner

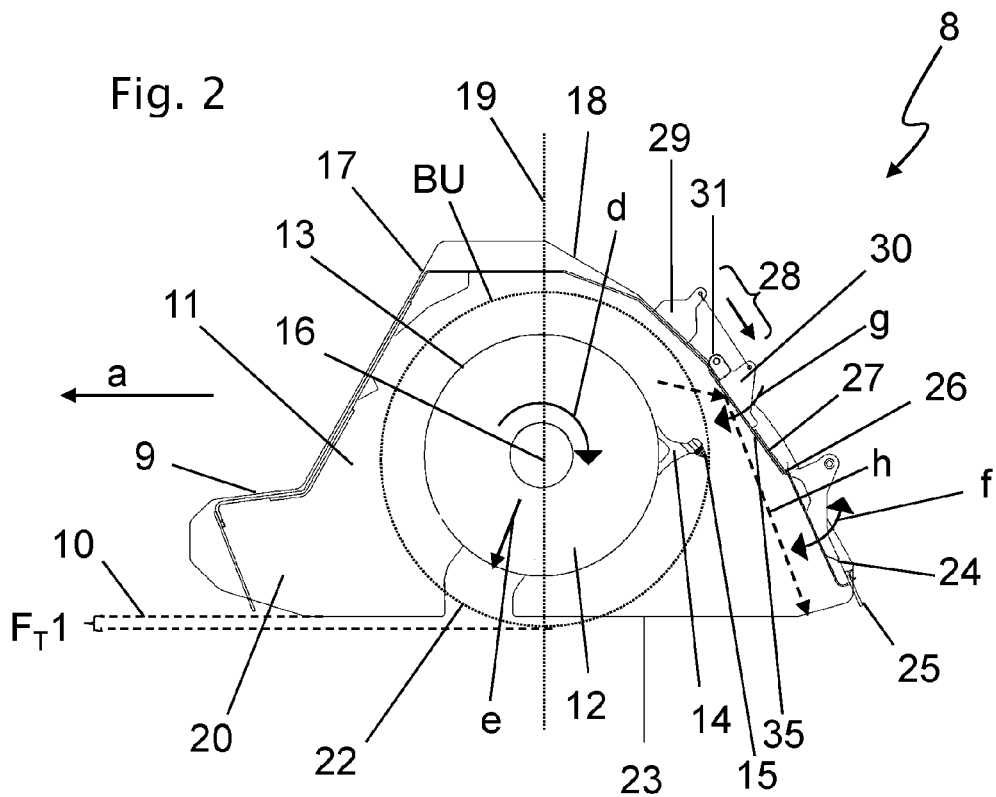
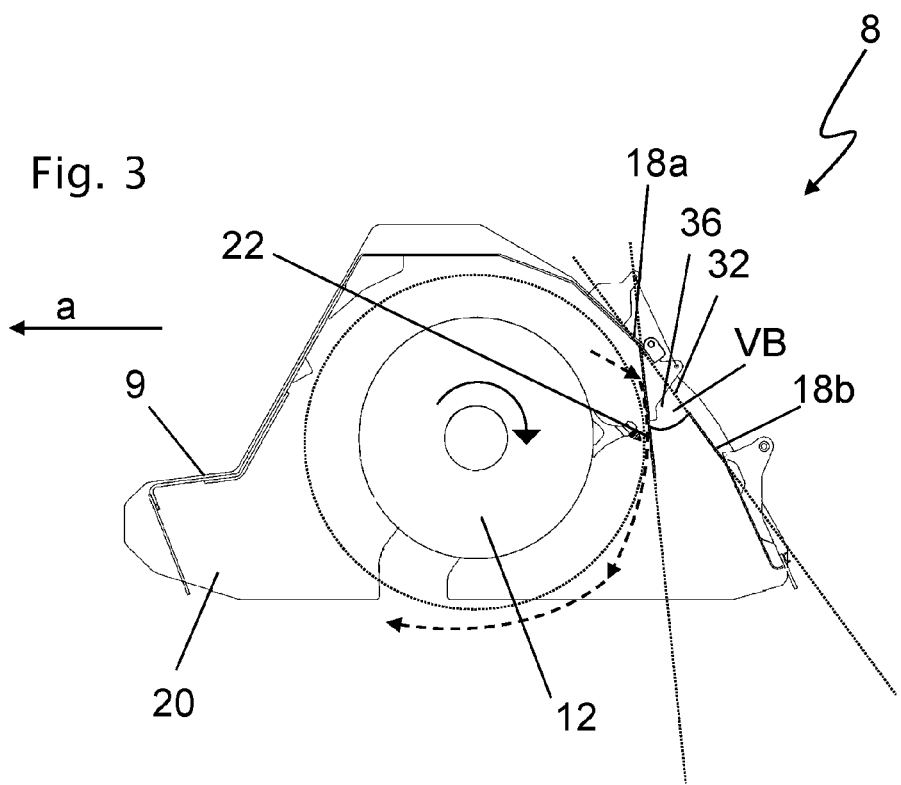

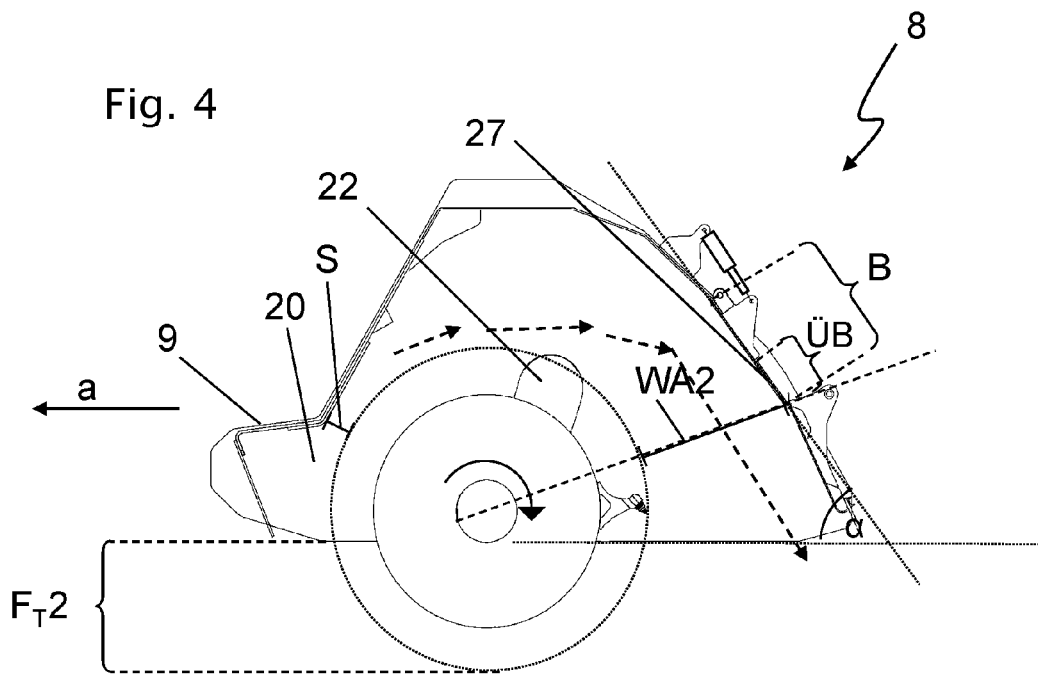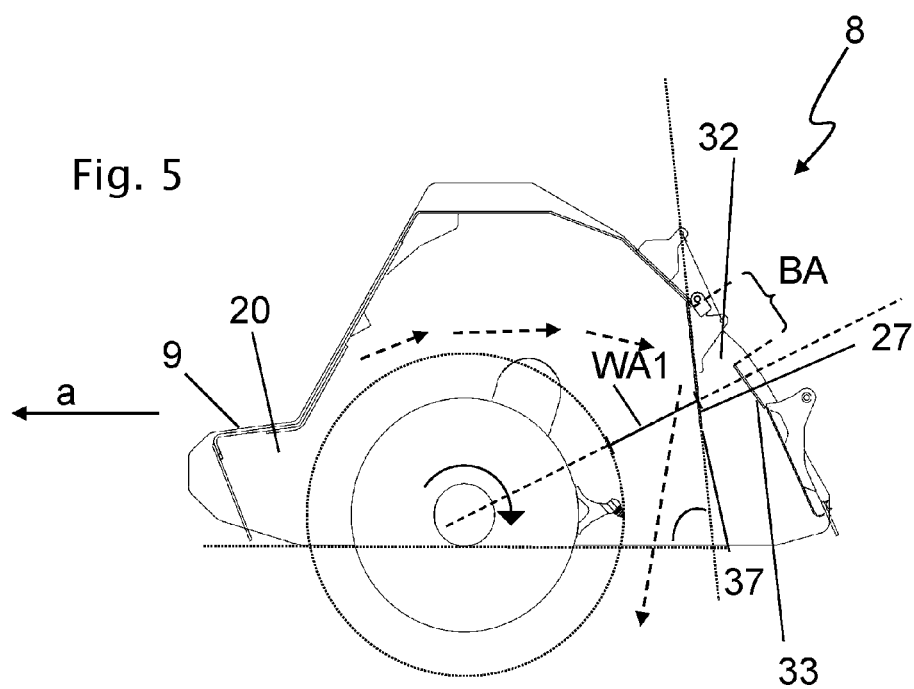

ROTOR HOOD FOR MILLING APPARATUS

CROSS-REFERENCE TO RELATED APPLICATIONS

This application is a submission under 35 U.S.C. §371 of International Application No. PCT/EP2011/005619, filed Nov. 9, 2011, which claims priority to German Application No. 10 2010 050 831.4, filed Nov. 9, 2010, the disclosures of which are hereby expressly incorporated by reference herein in their entireties.

FIELD OF THE INVENTION

The present invention relates to a rotor hood for a milling apparatus, comprising a front hood part, a rear hood part and two lateral hood parts, the front and the rear hood part enclosing together with the two lateral hood parts a working space that is open at the bottom, and a stripping apparatus mounted on the rotor hood that forms the rear lower edge of the rotor hood in the working direction. The present invention further relates to a construction machine, especially a recycler, a stabilizer or a cold milling machine comprising such a rotor hood, and a method for operating a milling machine with such a rotor hood.

BACKGROUND OF THE INVENTION

Milling machines for processing the ground are frequently used in order to break up and/or loosen the ground, to mix materials such as bonding agents (especially lime or cement) into the ground, add or distribute fluids (especially water), etc. In view of the specific applications, generic milling apparatuses are frequently classified as one of the following types of construction machines: milling machines, especially cold milling machines, stabilizers and recyclers. Cold milling machines are used for milling off road surfaces and ground coverings, while stabilizers are used for stabilizing non-supporting grounds and recyclers for repairing pavements in need of repair, wherein it will be appreciated that there can be some overlap concerning the spectrum of applications.

A generic milling machine for milling off and/or breaking up the ground and/or for mixing additives into the ground material usually comprises a milling rotor which is arranged horizontally and transversely to the working direction of the milling apparatus and which is rotatable about its cylinder axis. The milling rotor usually comprises a cylindrical roller body on which a plurality of suitable processing tools such as cutters is arranged. The milling rotor is arranged to be lowerable for processing the ground and for regulating the milling depth in the ground. In order to shield the milling rotor to the outside during working operation, the milling apparatus further comprises a rotor housing or rotor hood. The rotor hood is open towards the ground so that the milling rotor of the milling apparatus can come into contact with the ground to be processed. The hood is provided with a curved configuration for this purpose, wherein curvature shapes with corners and edges are included in the meaning of the word hood here. It is essential for the function of the rotor hood that it represents a kind of spatial limitation upwards and laterally, i.e., above the ground surface, for the milling rotor. Such a rotor hood is known from DE 20 2008 016 935 U1, for example.

Specifically, the rotor hood comprises a front hood part, a rear hood part and two lateral hood parts, which together form the rotor housing. According to its definition, the front hood part is the portion of the rotor hood which, in the working direction of the milling apparatus, lies in front of the longitudinal axis of the roller body of the milling rotor. The rear hood part is accordingly the portion of the rotor hood which lies behind the rotational axis of the milling rotor in the working direction, respectively when the milling rotor is in its maximally raised-up position in relation to the rotor hood, as the rotor hood is configured to be adjustable relative to the milling rotor. The lateral hood parts close off the space enclosed by the rotor hood to the sides and on the face side relative to the rotational axis and in the axial direction of the milling rotor. It will be appreciated that the front and the rear hood part and the two lateral hood parts can vary with respect to their specific shape. The importance of the shape of the rotor hood is the protective function achieved by the same in order to prevent the ejection of loosened and broken-up ground material during the working process. Another important function of the rotor hood is to limit the processing space around the milling rotor in order to effectively enable, e.g., thorough mixing and/or a milling operations. The rotor hood is adapted so that it extends downwards approximately to the level of the ground to be processed when in working operation in order to enable the most comprehensive and complete enclosure of the milling rotor outwards.

At the same time, the available free space between the milling rotor has an essential influence on the maximum output of the milling apparatus. The deeper the milling apparatus engages in the ground to be processed, the more free space is required between the milling rotor and the inside of the rotor hood facing the milling rotor in order to ensure the required removal of the milled ground material. For mixing processes, such as, e.g., for the admixture of a bonding agent into the ground, it is principally advantageous if the rotor hood encloses the milling rotor in a comparatively tight manner especially in the region to the rear in the working direction (the region behind the working roller in the working direction) and guides milled or ground material towards the milling rotor. Material that is milled in the front region—e.g., during a counter-rotating operation during which the processing tools of the working roller move in the area of engagement with the ground in the opposite direction of the motion of the ground relative to the working roller—is not deposited behind the milling rotor in the working direction in the case of a rotor hood that is tightly guided in the rear region but is conveyed to a large part again in the direction of rotation. As a result, this already loose ground material can be processed again by the working roller and thus be broken up and mixed even better. However, the improved mixing and milling operations have a negative effect on intake capacity for further ground material to be processed so that there is a comparatively lower milling speed at a fixed comparative milling depth and thus a lower efficiency of the milling apparatus with respect to the working speed.

However, if the rotor hood is configured so that especially the free space to the inside wall of the rotor hood behind the milling rotor in the working direction of the milling apparatus is comparatively large, the milled material will be deposited or thrown to a large extent to the rear or behind the milling rotor in the working direction and thus not transported back to the front of the milling rotor in the rotational direction. As a result, nearly the entire rotor output can be used for milling new material, thus enabling a very high milling speed at the determined comparative milling depth and a particularly high efficiency of the machine. However, the quality of the mixture and the extent and homogeneity of the milling will be adversely affected.

In addition to the curved housing for regulating an outlet opening in the rotor hood, the rotor hood of DE 20 2008 016 935 U1 further comprises a flap which is arranged on the rear housing part of the rotor hood in relation to the direction of travel. The direction of travel specifically indicates the direction in which the rotor hood or a milling apparatus is moved over the ground to be processed during working operation. An adjustable stripping lip is further arranged on a rear edge of the flap. The stripping lip is used to smooth the milled material behind the rotor hood. Alternatively, stripping apparatuses are also known which are configured in a fixed manner with respect to the rotor hood. In the simplest of cases, such stripping apparatuses can be a bottom edge of the rotor housing. Due to the fact that the stripping device is arranged on the flap in a pivotable manner, the angular position of the stripping device can be kept constant with respect to the ground at different positions of the flap.

The requirements placed on the milling machine with regard to milling, mixing and milling speed can vary significantly depending on the target objectives and depending on the properties of the ground material to be processed. The main focus can be, e.g., the maintenance of the most homogeneous milling or an especially constant distribution or mixture of the ground material to be processed with one or several additives. In other cases, the quickest possible processing of the ground may be advantageous. In addition, it is frequently desirable to enable better control of the ratio between rapid processing of the ground and efficient milling/mixing, e.g., in order to enable a more effective response to changing ground conditions during working operation.

SUMMARY OF THE INVENTION

It is therefore an object of the present invention to provide a rotor hood for a milling apparatus which improves the individual adjustment possibilities with regard to milling, mixing and milling speed in a milling apparatus with a rotor hood. At the same time, the rotor hood should continue to fulfil its protective function efficiently and offer a sturdy configuration in order to ensure smooth working operation.

One aspect of the present invention is that the rotor hood for a milling apparatus comprises a mixing flap which is movable within an adjustment range in the working space and which is mounted on the rotor hood separately from the stripping device which is mounted pivotably on the rotor hood. The working direction designates the direction in which the milling apparatus is guided over the ground during working operation. The stripping device forms the rear portion of the rotor hood and serves, in particular, to smooth the milled ground.

In contrast to the embodiments provided up until now in the state of the art, the present invention therefore proposes the use of a mixing flap that is independent or separate from the stripping device. The mixing flap is arranged for this purpose on the rotor hood in the working direction before the stripping device. The mixing flap is adjustably arranged and mounted on the rotor in such a way that it can influence the mixing process and/or the milling process during working operation of the milling apparatus.

For this purpose, the mixing flap is mounted to be movable within an adjustment range into the working space and out of the working space. The adjustment range extends between the position of the mixing flap in which it is moved maximally into the working space and the position in which it is moved maximally out of the working space. The mixing flap has an influence on the mixing and/or milling process in that it is arranged in such a manner that, by means of its adjustment within the adjusting range, the free space between the rotating milling rotor or the working roller and the mixing flap is changed, i.e., enlarged or reduced. The further the mixing flap is adjusted into the working space or the further at least one edge region of the mixing flap is adjusted towards the milling rotor, the narrower the free space will be between the milling rotor and the mixing flap, i.e., the space which the milled material needs to pass through in the rotational direction of the milling rotor in the interior of the rotor hood. If the mixing flap is positioned comparatively close to the milling rotor, i.e., the free space between the mixing flap and the working roller is comparatively small, the milled material will be deflected to the milling rotor and thus be re-processed by the milling rotor once or several times. The degree of mixing and/or milling increases accordingly.

This effect comes into play in particular when the mixing flap is arranged behind the milling rotor and in front of the stripping device in relation to the stream of milled ground material through rotor hood. The ground material is thus first broken up by the milling rotor and ends up in the interior of the rotor hood.

When the milling rotor is operating with a rotation counter to the working direction, the milled ground material is first taken up by the milling rotor and transported to the rear portion of the rotor hood. Here, the milled ground material comes into contact with the mixing flap and is deflected toward the milling rotor in the working direction when the mixing flap is in a position in which it is pivoted into the interior of the rotor hood so that the ground material that has already been processed by the milling rotor is at least partially taken up by the milling rotor again, which ultimately leads to improved mixing results. If, on the other hand, the mixing flap is pivoted outwards, the milled ground material does not come into contact again with the milling rotor and can leave the rotor hood through the stripping device.

The mixing flap thus ultimately represents a material distributing guide arranged between the milling rotor and the stripping device in relation to the stream of milled ground material through the rotor hood in the working direction of the milling rotor; a material distributing guide that, depending on its pivoted position in the stream of material, either lets the milled ground material be transported to the rear to the stripping device or deflects at least essential parts of said material for renewed processing through the milling rotor to the rear region of the milling rotor. Therefore, if the mixing flap is positioned within its adjustment range so that the free space between the mixing flap and the milling rotor is comparatively large, the obstructing or deflecting effect of the mixing flap is reduced. A large part of the milled material is ejected to the region behind the milling rotor and is not deflected back to the milling rotor. Accordingly, the degree of mixing and/or milling is reduced, thereby allowing an increased working speed of the milling apparatus. By adjusting the mixing flap within its adjustment range, it is thus possible to change the free space between the mixing flap and the milling rotor, i.e., the free space which the milled material needs to pass through within the rotor hood during working operation, and thus to conduct the stream of milled ground material in the rotor hood either toward the milling rotor or toward the stripping device. It is thus ensured that the extent of the milling and mixing can be controlled and adjusted to individual conditions. In summary, the mixing flap in accordance with the present invention thus also allows an adjustment of the milling and/or mixing operations that is independent of the relative position of the rotor hood in relation to the milling rotor.

A further aspect of the present invention is that the mixing flap is mounted in a spatially separate manner from the stripping device. The mixing flap is thus an element that is adjustable independently of the stripping device, i.e., the positioning of the mixing flap is not influenced by the stripping device and is completely independent of the position of the stripping device. The stripping device is thus also mounted in an essentially movable, e.g., pivotable, manner on the rotor hood.

In accordance with another aspect of the present invention, the stripping device and the mixing flap are constructed and spatially located completely separate from one another and can thus be fixed in their respective positions irrespective of one another and individually. If the stripping device is adjustable in any way, both the mixing flap and the stripping device are each separately linked to the rotor hood. This way, it is possible, e.g., to control the mixing and/or milling operations by an adjustment of the mixing flap within the adjustment range during the working process without having to alter the position of the stripping device. Overall, the handling of the rotor hood in accordance with the present invention is thus substantially simplified.

It is further advantageous to mount the mixing flap on the rotor hood before the stripping device in relation to the working direction of a milling apparatus equipped with a rotor hood in accordance with the present invention, especially before the bottom edge of the stripping device that is relevant for the stripping process (usually a rubber lip). The stripping device usually forms the rear end of the rotor hood over the working width of the milling apparatus and is responsible for smoothing the milled material and typically represents a kind of outlet opening for the milled material out of the rotor hood. As a result of the arrangement of the mixing flap before the stripping device, it is possible to guide milled material selectively towards the rotor or towards the stripping device and thus vary the portion of the milled material re-fed to the milling rotor or deposited on the milling bed and subsequently smoothed by the trailing stripping device.

The manner of the movement of the mixing flap within the adjusting range can vary. The mixing flap can be mounted on the rotor hood, e.g., so that it is linearly adjustable within the adjusting range. In the simplest of cases, the mixing flap can thus be slid into the working space and at least partly in the direction of the working roller, especially by, e.g., a guide slot located in the rotor hood. In addition to such a linear adjusting movement, more complex adjustment movements are possible in which pivoting adjustment movements and linear adjustment movements are carried out simultaneously. It has proven advantageous in practice, however, if the mixing flap is pivotable into the working space, i.e., pivotable about a pivoting axis within the adjusting range between a position in which it is moved maximally into the working space and a position in which it is moved maximally out of the working space. Pivoting movements can be realized in a comparatively simple way, e.g., by a corresponding pivot bearing. Moreover, a pivotable mixing flap is particularly reliable during working operation. The pivoting axis of the mixing flap preferably is parallel to the rotational axis of the milling rotor. The bearing of the pivotable mixing flap is further preferably configured so that the mixing flap is mounted on the rotor hood with its front region in the working direction and is accordingly pivotable into the working space with its rear region in the working direction. A deflection wedge is obtained by pivoting the mixing flap into the working space, the angular position of the impact surface of which is adjustable. As a result of this adjustment, the milled material can be deflected towards the milling rotor, i.e., in the working direction, or away from the milling rotor. By means of a pivotable mounting of the mixing flap, it is possible to cover a wide spectrum of different angular positions. In principle, the linkage of the mixing flap preferably occurs at the rear hood part so that the front region of the mixing flap in the working direction preferably lies above the rear region of the mixing flap in the vertical direction in this embodiment.

It is possible that the mixing flap is arranged to lie completely on the inside, i.e., completely in the working space of the rotor hood, and is completely shielded outwards by the hood parts of the rotor hood, especially by the rear hood part. Complete shielding is not mandatory, however. For example, an opening or passage can also be present in the rotor hood, by means of which access from the outside through the rotor hood to the mixing flap arranged on the inside of the rotor hood is possible. Moreover, depending on the configuration, this embodiment has the advantage that it allows one to look inside the rotor hood. The mixing operation can thus be monitored in situ and optionally adjusted during the working process. It has proven especially useful to mount the mixing flap on the rotor hood in such a way that it completely closes off the opening outwards when in the position in which it is maximally pivoted out of the working space. It is thus ensured that, in the case of a maximum milling speed (minimal milling and/or mixing by a mixing flap which is maximally pivoted out of the working space), the rotor hood will shield an enclosed space (in this case together with the mixing flap) and, therefore, no milling material will reach the outside through the opening. In this embodiment, the mixing flap can be configured with a surface area considerably larger than the opening. It is possible in a further alternative to adapt the size, i.e., the planar extension, of the mixing flap to the size of the opening in the manner that the size of the mixing flap substantially corresponds to the size of the opening. The mixing flap can thus be mounted directly in the opening or at the level of the opening in this embodiment.

Irrespective of the ratio of the size of the opening in relation to the size of the mixing flap, it has proven advantageous to provide the opening with a protective cover especially from the outside, e.g., in the form of a grate or net covering. The protective covering is substantially used for the purpose of preventing the ejection of ground material, i.e., lumps/rocks/fragments, as of a specific size through the opening when the mixing flap has been pivoted into the working space. On the other hand, it is still possible to look into the interior space of the rotor hood because the protective covering does not completely close off the opening.

An essential criterion of the opening is further that it is circumferentially delimited by the rotor hood at the level of the rotor hood or at least by components connected directly with the rotor hood. The opening will therefore never form a bottom edge of the rotor hood. The outer contour of the opening is circumferentially entirely formed by the rotor hood. For example, if the mixing flap is arranged on the rear part of the hood, the opening is delimited to the rear by a part of the rear hood part or at least a stripping element linked to the rotor hood. The opening can further extend over a part of the working width, wherein it is preferable if the opening extends over the entire working width of the milling apparatus. In this embodiment, the opening has, e.g., a rectangular shape. The working width of the milling apparatus designates the width at which the milling apparatus processes the ground during working operation.

The adjusting range is preferably chosen so as to obtain a sufficient adjustment of the mixing flap for deflecting the milled material in the desired direction. In other words, the adjusting range is preferably chosen so that sufficient variation between the milling operation and the mixing operation is possible. The adjusting range of the mixing flap is naturally further delimited by the milling rotor at least in the direction of the same. In the case of a mixing flap arranged at least partly to the inside, the maximum adjustment for the outward pivoting motion of the mixing flap results from the position of the inside surface of the rotor hood in relation to the mixing flap. Irrespective of these naturally occurring limitations in the adjusting range, the mixing flap is preferably mounted in the case of a pivot bearing in such a way on the rotor hood that the adjusting range lies in the range of 15° to 90° in the plane perpendicular to the pivoting axis of the mixing flap, especially in the range of 20° to 45°. The chosen adjusting range is thus already broad enough in order to enable a regulation of the milling and/or mixing operations.

In addition to the principal dimensions of the adjusting range, the inclined position of the mixing flap in relation to the level of the ground is an essential parameter for the working mode of the mixing flap. This angle, which is known as the set angle, thus indicates the angle between the level of the ground in the working direction of the milling apparatus and the extension of the mixing flap in the vertical plane in which this level of the ground lies, i.e., in the plane orthogonal to the rotational axis of the milling rotor. The mixing flap is preferably pivotable in a range in which set angles between 30° to 90°, especially between 50° to 85°, are possible. These set angles have proven advantageous inasmuch as the desired regulation of the milling and/or mixing operations is rendered possible, while simultaneously enabling a compact configuration of the rotor hood.

A limitation of the adjusting range of the mixing flap can basically be achieved by different measures, but is achieved in a particularly simple and effective way within the scope of a preferred embodiment by providing an adjustment limit. The adjustment limit is configured so that it limits an adjusting motion into and/or out of the working space. It will be appreciated that two adjustment limits can be combined with one another, wherein one adjustment limits the pivoting motion in one direction and the other adjustment limitation limits the pivoting motion in the other pivoting direction. Alternatively, the adjustment limit can be configured so that it simultaneously limits the adjustment movement on both sides of the adjustment range. Once the mixing flap reaches a limit of the adjustment range (which is desired, i.e., limited by at least one adjustment limit in at least one direction), it is prevented by the adjustment limit from continuing the motion.

The specific configuration of the adjustment limit can vary within a wide spectrum. First of all, it is essential that the adjustment limit safely and reliably prevents an adjustment of the mixing flap beyond the adjustment limit. This is achieved in an especially simple way with a suitable stop, especially, e.g., an inside stop on the inside wall of the rotor hood, against which the mixing flap strikes in a pivoting adjustment movement out of the working space. Similarly, a further stop can be provided against which the mixing flap strikes during an adjustment movement into the working space. The use of a stop for adjustment limitation has the advantage that stops are especially unproblematic with respect to their handling. Moreover, stops are generally able to absorb relatively high forces.

It is fundamentally possible to configure the mixing flap from several subunits, e.g., from two individual mixing flaps arranged in the axial direction of the milling rotor adjacent to one another on the rotor hood or behind each other in the working direction. These subunits can also be arranged to be individually adjustable. However, the mixing flap is preferably configured as one piece in order to simplify the overall construction.

The specific shape and spatial design of the mixing flap can also vary. On the one hand, the configuration of the mixing flap as an essentially planar plate-shaped element has proven advantageous because it can be produced comparatively inexpensively. On the other hand, it is also possible to adapt the cross-sectional profile of the mixing flap at least roughly to the curved shape of the rotating milling rotor. This offers the advantage that the space between the milling rotor and the mixing flap can be regulated especially well over a substantially longer section of the circumference of the milling rotor by an adjustment, especially by a pivoting, of the mixing flap. It is principally sufficient merely to adapt the tip region of the mixing flap, whether curved or linear, so that it is bent towards the milling rotor. Alternatively, the entire mixing flap can be configured to be bent in its cross-sectional profile, e.g., in the shape of an arc.

It is further possible to adapt the dimensions of the mixing flap so that it covers merely a partial area of the working width of the milling apparatus, e.g., the middle of the working width with only a partial covering of the working width. In order to obtain especially consistent working results, however, the mixing flap preferably extends at least over the entire working width of the milling apparatus and especially over the entire rotor hood between the two lateral hood parts in order to unfold its regulatory effect on the milling and mixing operations over the entire working width.

In the simplest of cases, the mixing flap is mounted on the rotor hood so that it can be fixed at least in the position in which it is moved maximally into the working space and in the position in which its moved maximally out of the working space. Fixing can be achieved by means of corresponding locking mechanisms, e.g., by way of a suitable catch mechanism. In addition, further intermediary locking positions can be provided, e.g., on the basis of a series of catches. It is principally preferable, however, to configure the mixing flap in a continuously adjustable or continuously lockable manner, whereby a particularly individual regulation of the milling and/or mixing operations is achieved.

The mixing flap or the mounting of the mixing flap on the rotor hood can further be configured so that the adjustment occurs manually within the adjustment range. It is more convenient for the user, however, if a drive device is provided that is configured for driving the adjustment of the mixing flap. Such a drive device can be a hydraulic cylinder-piston unit, an electromotively driven lifting spindle or the like. It is especially preferred if a fixing of the mixing flap in a selected position within the adjustment range also occurs simultaneously by means of the drive device. Here as well, e.g., a hydraulic cylinder-piston unit or an electromotively driven lifting spindle with self-locking properties is especially suitable. This way, a separately controllable fixing device is not necessary.

The drive device can further comprise a control unit which enables a regulation of the mixed flap position within the adjustment range during the working operation. The user of a milling apparatus in accordance with the present invention can then change the position of the mixing flaps during the working operation and react to changing ground conditions.

An advantage of the present invention is that an adjustment of the mixing flap is enabled that is independent of the position of the stripping device. There are also cases, however, in which the position of the mixing flap should be in a specific relation to the position of the stripping device and vice-versa, e.g., in order to adjust the height of the stripping device or to regulate the position of the mixing flap in reaction to different milling depths. It has proven advantageous in these cases if a further synchronizing apparatus is provided. The synchronizing device is thus configured so that it converts an adjustment of the mixing flap into a simultaneous corresponding adjustment of the stripping device and vice-versa. This can occur, for example, via a suitable synchronizing gear transmission or the like. By monitoring and regulating the stripping device, the machine operator can thus simultaneously adjust the mixing flap.

The object of the present invention is further achieved by a construction machine, especially a recycler, a stabilizer or a milling machine, in particular a cold milling machine, comprising a milling apparatus and a rotor hood according to the preceding embodiments. The construction machine can concretely be configured as an automotive vehicle, in which case it comprises a machine frame on which the rotor hood and the milling rotor are mounted, each in particular in a height-adjustable manner. The present invention also comprises non-automotive construction machines which are accordingly configured to be connected to a tractive unit or for attachment to a tractive unit such as, e.g., a tractor. In particular, these can be towed milling machines.

A further aspect of the present invention for achieving the object lies in a method for operating a milling apparatus, especially a milling apparatus for one of the aforementioned construction machines, the method being characterized by a regulation of the mixing operation and/or the degree of milling by an adjustment of the mixing flap according to the aforementioned embodiments within the working space of a milling apparatus. The key to the method in accordance with the present invention thus consists in the selective influence on the mixing and/or milling operations enabled by the separate adjustment of a mixing flap and independently of further elements of the rotor hood, e.g., such as a stripping device. In particular in the event that an adjustable stripping device is provided, the control of the mixing flap is completely independent of the adjustment of the stripping device and thus represents an independent control variable. In accordance with the present invention, it is further provided that the mixing flap is configured and arranged so that the milled material is deflected toward the milling rotor or toward the material outlet out of the rotor hood by means of an adjustment of the position of the mixing flap. This material guide function occurs within the rotor hood after the milled ground material has been transported by the milling rotor to the interior of the rotor hood and before the milled ground material passes the stripping device when leaving the interior of the rotor hood.

BRIEF DESCRIPTION OF THE DRAWINGS

The present invention is explained below in greater detail by reference to the embodiment schematically shown in the drawings, wherein:

FIG. 2 shows a vertical longitudinal sectional view through the milling apparatus with the rotor hood of FIG. 1 with a mixing flap pivoted out of the working space and a retracted milling rotor;

FIG. 3 shows the vertical sectional view of FIG. 2 with a mixing flap pivoted into the working space;

FIG. 4 shows the vertical sectional view through the milling apparatus of FIG. 2 with extended milling rotor and with the mixing flap pivoted out of the working space;

FIG. 5 shows the vertical sectional view of FIG. 4 with the mixing flap pivoted into the working space;

DETAILED DESCRIPTION OF THE INVENTION

Figure 1:
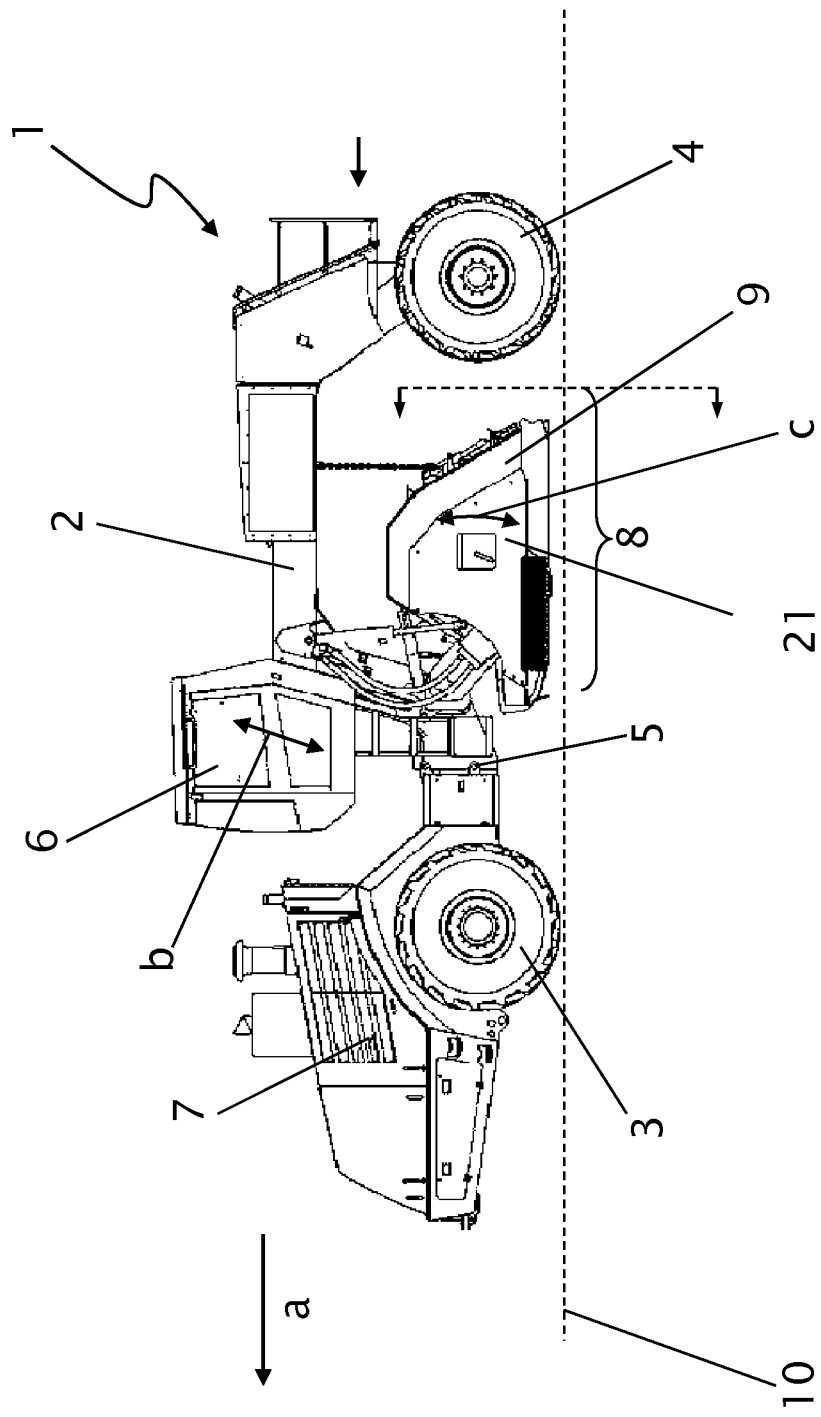
FIG. 1 shows a side view of a construction machine with a rotor hood.

Components that are structurally and/or functionally identical are indicated with the same reference numerals in the drawings.

The construction machine 1 shown in FIG. 1 is a so-called stabilizer or a recycler, depending on how it is used. The construction machine 1 comprises a machine frame 2, a pair of front wheels 3 and a pair of rear wheels 4, wherein merely the wheels arranged on the left side in the working direction "a" are visible. The working direction "a" is the direction in which the construction machine moves over the ground to be processed when in working operation. The machine frame 2 has a bi-partite configuration comprising two frame members that are connected with each other by means of an articulated steering joint connection 5. A driver's cabin 6, which is height-adjustable along the direction of the arrow "b", is arranged at the level of the articulated steering joint connection 5. The required drive power is obtained by means of a drive apparatus 7 which provides both the drive power required for driving the construction machine 1 and for driving the milling apparatus 8 which is illustrated below in greater detail. The construction machine 1 according to FIG. 1 is thus an automotive construction machine. It is principally also possible to configure the milling apparatus as a non-automotive construction machine, e.g., in the form of a towed milling machine.

The milling apparatus 8 comprises a protective or rotor hood 9 (the terms "protective hood" and "rotor hood" are used below synonymously), which outwardly shields a milling rotor (not shown in FIG. 1). The protective hood 9 thus encloses the space around the working device of the milling apparatus 8 upwards and laterally. This interior space of the rotor hood 9 is referred to below as the working space. The protective hood 9 has an open configuration at the bottom or towards the ground 10 so that the milling rotor mounted in the interior of the protective hood 9 can be lowered to the ground 10 and brought into contact with the ground material to be processed. The milling rotor, as well as the protective hood 9, are height-adjustable relative to the machine frame 2 in the direction of the arrow "c" and comprise a corresponding adjusting or pivoting apparatus. The milling rotor is further height-adjustable in relation to the protective hood 9. In the position shown in FIG. 1, the milling rotor is raised and not in contact with the ground 10 to be processed. For the milling operation, at least the milling rotor is lowered in the direction of the arrow "c" into the ground up to the desired milling depth.

Further details of the construction of the milling apparatus 8 and the interaction of the milling rotor with the special configuration of the protective hood 9 are shown in FIGS. 2 to 6.

The construction and the principle of operation of the milling apparatus 8 are explained here with reference to FIG. 2. The essential components of the milling apparatus 8 are the protective hood 9 and the milling rotor 12 arranged in the interior of the protective hood 9. The milling rotor 12 is specifically a cylindrical working roller 13, on the outside circumferential surface of which a plurality of processing tools are arranged. A working space 11 lies between the working roller 13 or the milling rotor 12 and the inside wall of the protective hood 9. The working space 11 is thus the free space between the milling rotor 12 and the protective hood 9. In the working space 11, the milled material is conveyed and optionally processed (especially mixed and/or broken up) by the milling rotor 12 which rotates around its rotational axis 16. For the sake of the clarity of the illustration, FIGS. 2 to 6 only show one tool holder 14 with a tool 15 representatively in order to illustrate the positioning of the processing tools. It will be appreciated that in reality several of these tool holders 14 and tools 15 are arranged circumferentially and over the working width of the milling apparatus 8 on the working roller 13. FIG. 2 further shows a processing circumference (cutting circle) "BU" as a dotted line, indicating the outside circumference of the milling rotor 12 which rotates during working operation about the bearing axis 16 in the direction of the arrow "d". During a counter-rotating operation, the milling rotor 12 thus rotates in the working direction "a" and in a direction opposite to the advance direction of the ground 9 not yet milled in relation to the milling apparatus 8. The processing circumference "BU" indicates the outside circumference of the rotating milling rotor 8, the circumferential boundary being determined by the tips of the tools 15 as the elements that protrude maximally in the radial direction.

FIG. 2 illustrates that the milling rotor 12 is shielded by the protective hood 9 on the sides facing away from the ground 10. The protective hood 9 has a front hood region 17 and a rear hood region 18 for this purpose, the "front hood region 18" accordingly designating the portion of the protective hood 9 before—relative to the working direction "a"—a straight line 19 that extends vertically through the bearing axis 16, and the "rear hood region 18" designating the region of the protective hood 9 behind the straight line 19 in the working direction "a". The protective hood 9 further comprises two side walls 20 and 21, FIG. 1 merely showing the side wall 21 facing the observer and FIGS. 2 to 6 showing the side wall 20 on the opposite face side of the milling rotor 12. The side walls 20 and 21 and the front hood region 17 and the rear hood region 18 jointly form a continuous arched housing which is provided with an open configuration towards the ground 10 and comprises the milling rotor 12 in the interior of its housing.

The protective hood 9 is pivotably mounted in relation to the machine frame 2 in the direction of the arrow "c" and can therefore be lowered, e.g., from its position starting from FIG. 1, towards the ground 10. Similarly, the relative position of the milling rotor 12 can be adjusted in relation to the protective hood 9 and the machine frame 2 as well as in the direction of arrow "c" starting from FIG. 1. A corresponding adjusting recess 22 is provided for this purpose in the side wall 20, along which adjusting recess the adjusting movement of the milling rotor 12 runs relative to the protective hood 9. The adjustability of the milling rotor 12 relative to the protective hood 9 is indicated in FIG. 2 by the arrow "e". The maximum adjustment range of the milling rotor 12 relative to the protective hood 9 is obtained from the combination of, e.g., the ranges shown in FIGS. 2 and 4. In FIG. 2, the milling rotor 12 has been maximally retracted into the protective hood 9, while in FIG. 4 the milling rotor 12 is extended maximally out of the protective hood. The bottom edge 23 of the protective hood 9 is usually guided along the ground 10 to be processed at the level of the surface during working operation. In this case, the milling rotor in FIG. 2 would protrude with the milling depth $F_T1$ beyond the bottom edge 23 of the protective hood 9. The lowering of the milling rotor 12 in relation to the protective hood 9 in the direction of the arrow "e" can now occur until the maximum milling depth $F_T2$ in accordance with FIG. 4 has been reached, at which depth the milling rotor 12 protrudes with its processing circumference "BU" in the vertical direction considerably further beyond the bottom edge 23 of the protective hood 9 and is correspondingly immersed considerably deeper into the ground to be processed.

Figure 6:
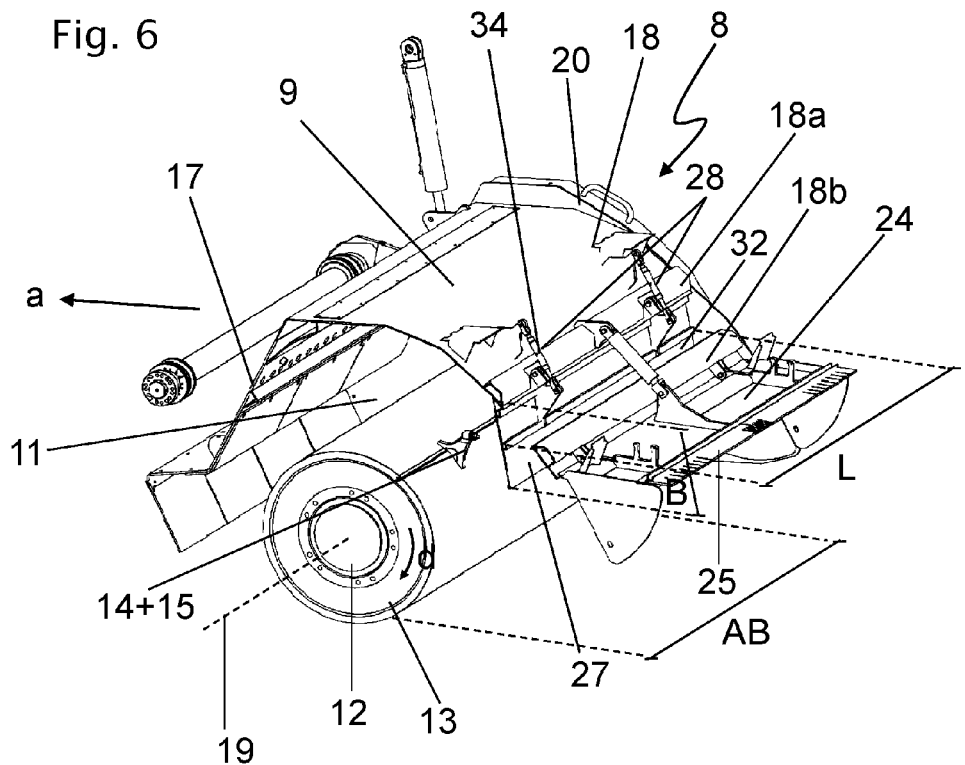
FIG. 6 shows a perspective oblique view of the rotor hood obliquely from behind.

The protective hood 9 further comprises a pivotably mounted stripping flap 24, whose outside edge is formed by a rubber lip 25 extending over the working width of the milling apparatus and terminates in a virtually flush manner with the bottom edge 23 towards the rear 8. The stripping flap 24 thus forms the rear terminal part of the protective hood 9 with respect to the rear hood region 18. The stripping flap 24 is pivotable about the pivoting axis 26 in relation to the housing of the protective hood 9 and especially in relation to the rear hood region 18 in the direction of the arrow "f" so that the height of the rubber lip 25 can be adjusted to the respective working conditions in order to obtain an evenly smoothed stripping pattern. The bearing axis 26 or pivoting axis 26 of the stripping flap 24 runs parallel to the bearing axis 16 or rotational axis 16 of the milling rotor 12. In order to adjust the stripping flap 24, an adjusting device is provided (which is specifically a hydraulic cylinder piston unit), which is not shown in greater detail in FIGS. 2 to 5. FIGS. 2 to 5 further show the stripping flap 24 in the downwardly pivoted position while FIG. 6 shows the stripping flap 24 in the upwardly pivoted position. The stripping flap 24 thus regulates a material outlet opening out of the interior of the rotor hood 9 via which the milled ground material leaves the interior of the rotor hood 9 in working operation outwards.

One feature of the protective hood 9 is a mixing flap 27 that is adjustable in a determined adjustment range relative to the protective hood 9 and which can be pivoted from the outer adjustment position shown in FIG. 2 (and FIG. 4) up to a position in which it is maximally pivoted into the working space 11 shown in FIG. 3 (and FIG. 5). The effect of the mixing flap on the stream of milled ground material inside the rotor hood is indicated in FIGS. 2 to 5 by the broken arrows, which illustrate the flow of the milled ground material in the interior of the rotor hood 9 during the working operation of the milling rotor 12 in a strongly schematic manner. The mixing flap 27 is essentially a planar rectangular plate element which extends in a strip-like manner over the entire working width "AB" of the milling apparatus 8 and has the width "B" and the length "L". An adjustment range "VB" of approximately 30° is obtained here in relation to the plane perpendicular to the rotational axis 16 of the milling rotor 12. An example of an adjustment range "VB" is indicated in FIG. 3; this adjustment range results from the adjustment angle of the intersecting straight line through the mixing flap 27 in the pivoting plane of the mixing flap 27 in a position in which the mixing flap 27 is pivoted maximally into the working space 11 (FIGS. 3 and 5) and a position in which it is pivoted maximally out of the working space (FIGS. 2 and 4). The arrow "g" in FIG. 2 indicates the pivoting direction commencing from the maximally outwardly pivoted position. The mixing flap 27 is adjustable in the direction opposite to that indicated by the arrow "g" to the position in which it is pivoted maximally out of the working space 11. The mixing flap 27 is further arranged on the rotor hood 9 in such a manner that it is arranged between the milling rotor 12 and the outlet opening or stripping device 24 in relation to the direction of the stream of milled ground material through the rotor hood 9. With respect to its function, the mixing flap 27 represents a kind of distributing guide or material guide device that, depending on its pivoted position, guides the ground material having passed the milling rotor 12 from the rear region of the rotor hood 9 back to the milling rotor 12 or enables the further transport of the ground material having passed the milling rotor 12 toward the stripping device 24 and to the outlet of the rotor hood 9.

The mixing flap 27 is thus also arranged in the rear hood region 18 in order to come into contact with the ground material that is carried by the milling rotor 9 and released by the same in the interior of the rotor hood.

It is further important that the pivotable bearing of the mixing flap 27 is adjustable in relation to the horizontally extending ground 10 at a specific set angle α for regulating the mixing and/or milling operations. The set angle α thus corresponds to the angle in the pivoting plane of the mixing flap or in the rotational plane of the milling rotor 12 which is found between the horizontal ground 10 to be processed and the extension of the section through the mixing flap 27 in this plane in the working direction "a". In the present embodiment, the maximum set angle α according to FIG. 5 is therefore approximately 85° and the minimum set angle α according to FIG. 4 is approximately 55°. Depending on the set angle α, the ground material milled off by the milling rotor 12 is deflected by the mixing flap 27 in the region within the protective hood 9 to the rear in the working direction "a" (FIGS. 2 and 4) or back to the milling rotor 12 (FIGS. 3 and 5).

In order to adjust the mixing flap 27, an adjusting unit 28 is provided. The adjusting unit 28 is configured to be remote-controllable by an operator and allows automatic adjustment of the mixing flap 27. The adjusting unit 28 specifically comprises a hydraulic cylinder piston unit 34 which is shown in greater detail in FIGS. 4 and 6 and which is arranged between a bearing bracket 29 in the rear hood region 18 and a bearing bracket 30 on the mixing flap 27. In the present embodiment, the mixing flap 27 is further adjustable or pivotable independently of the stripping flap 24. It is also possible to provide a synchronizing device (not shown in the drawings) which is configured so that it converts an adjustment of the pivoting position of the mixing flap 27 into a simultaneous adjustment of the pivoting position of the stripping flap 24 and/or an adjustment of the pivoting position of the stripping flap 24 into a simultaneous adjustment of the pivoting position of the mixing flap 27.

The mixing flap 27 is pivotably mounted via a pivot joint with a bearing or pivoting axis 31 directly on the rear hood region 18; its angular position can thus be adjusted in the vertical plane in the working direction "a" (which corresponds to the plane of intersection in FIGS. 2 to 5) by the adjustment unit 28. The mixing flap further extends in the direction of the longitudinal axis 19 (length "L") in an integral, i.e., solid, and uninterrupted manner over the entire working width "AB" of the milling apparatus 8, as shown in greater detail in FIG. 6.

An opening 32 is further provided in the region of the mounting of the mixing flap 27 in the rear hood region 18 of the rotor hood 9 and is framed by the regions 18a and 18b of the rear hood region 18 lying opposite one another as well as laterally by the adjacent regions of the side walls 20 and 21 (i.e., in the axial direction of the rotational axis or bearing axis 16 of the milling rotor 12). The bearing bracket 30 of the mixing flap 27 protrudes through this opening 32 from the working space 11 outwards through the protective hood 9. It is thus possible to inspect the region of the mixing flap 27 from the outside or check the results of the mixing and/or milling during working operation. Optionally, the opening 32 can be covered during working operation outwards with a protective grate in order to prevent the ejection of milling material through the opening 32, at least as of a specific size of the milled material.

The mixing flap 27 is provided with respect to its width "B" with a substantially wider configuration than the width "BA" of the opening 32 (merely shown in FIGS. 4 and 5). As a result, the mixing flap 27 is not able to pivot through the opening 32 outwards from the interior of the working space 11, but strikes the inside stop 33 on the inside wall of the protective hood 9 in the overlapping region "ÜB" lying in the pivoting direction with its side facing away from the milling rotor 12. The inside stop 33 is formed by a region 18b of the rear hood region 18 which extends in a ridge-like manner over the entire working width of the milling apparatus 8.

In relation to the dimensions of the protective hood 9, the mixing flap 27 is arranged approximately in the middle of the protective hood 9 with respect to its vertical dimensions and in the rear third of the protective hood 9 on the protective hood 9 with respect to its horizontal extension. The mixing flap 27 is further dimensioned in relation to the protective hood 9 in such a way that the bottom edge in the vertical direction lies significantly above the ground 10 in every pivoted position. The mixing flap 27 thus does not have a stripping function in any position. The mixing flap 27 is thus completely autonomous vis-à-vis the stripping flap 24 with respect to both construction and control. An adjustment of the mixing flap 27 thus has no influence on the positioning of the stripping flap 24 and vice versa. If such an influence is desired, a synchronization apparatus can additionally be arranged between the mixing flap 27 and the stripping flap 24. The synchronization device, e.g., a suitable gear, functionally couples the mixing flap 27 with the stripping flap 24 so that an adjustment of the stripping flap 24 is converted into a parallel adjustment of the mixing flap 27 and vice versa.

The regulatory effect of the different mixing flap positions on the crushing and/or mixing process is described below in greater detail. In FIGS. 2 and 4, the mixing flap 27 is in contact with the inside wall of the protective hood 9 and is thus pivoted out of the working space 11. Material that is milled off by the milling rotor 12 will be conveyed upwardly at first in the working direction a and subsequently to the rear region of the protective hood 9 and collides to a large part with the mixing flap 27. The side of the mixing flap facing the milling rotor 12 thus forms an impact surface 35 for the milled material, which impact surface is the contact area for a deflection wedge 36 formed by the extended mixing flap 27 and the milled material is conveyed upwardly and to the rear in the rotational direction "d" with respect to the working direction "a". As a result of the position of the mixing flap 27 which is pivoted out of the working space 11, the milled material is essentially deposited in the rear part of the protective hood 9 on the ground 10, as indicated by the broken arrow "H" in FIG. 2. Material that has been milled off once is thus deposited directly behind the milling rotor 12 so that virtually the entire output of the milling rotor 12 can be used for milling off new ground material.

If, on the other hand, the mixing flap 27 is pivoted into the working space 11, as illustrated, e.g., in FIGS. 3, 5 and 6, the milled material collides with the mixing flap 27 behind the milling rotor 12 at a considerably steeper angle and is thus again deflected to the milling rotor 12 and not further transported to the rear to the material outlet out of the rotor hood 9. This way, a higher proportion of milled material is taken up again by the milling rotor 12, conveyed forward or in front of the milling rotor 12 in the working direction "a" and subsequently deflected backward again. The milling rotor 12 thus processes the milled material several times, whereby an increased milling and/or mixing of the milled ground material is achieved.

A further effect of the mixing flap 27 is illustrated in FIGS. 4 and 5, in which the radial distance "WA" of the processing circumference "BU" with respect to the working drum 13 from the bottom edge 37 of the mixing flap 27, which is pivotable into the working space 11, is indicated. A comparison of FIGS. 4 and 5 illustrates that the inward pivoting of the mixing flap 27 into the working space 11 substantially reduces the gap between the bottom edge 37 and the processing circumference "BU". The milled material thus has only a substantially smaller space for passing the mixing flap 27 in the rotational direction "d" of the milling rotor 12, as a result of which better milling results are obtained. Essential, however, is the deflecting effect of the mixing flap toward the milling rotor 9 so that the same ground material can be processed and turned over repeatedly by the milling rotor 9. It is further important in this connection that the maximum size of the materials that reach the interior of the rotor hood does not depend on the mixing flap 27 behind the milling rotor 12, but rather on the width of the material inlet into the rotor hood between the milling rotor 9 and the inside wall of the rotor hood. The width and position of this area can vary depending on the relative position of the milling rotor 12 and the rotor hood 9 and is indicated in FIG. 4, e.g., with the reference sign "S". This area lying before the milling rotor 12 in the direction of movement of the flow of material is, however, completely detached from the effect and principle of operation of the mixing flap 27 between the milling rotor and the stripping device 24.

With the present embodiment of the protective hood 9, the operator is thus able to regulate the milling and/or mixing operations by changing the position of the mixing flap 27 within the adjustment range and thereby to set the desired degree of milling and/or mixing.

Figure 7A:
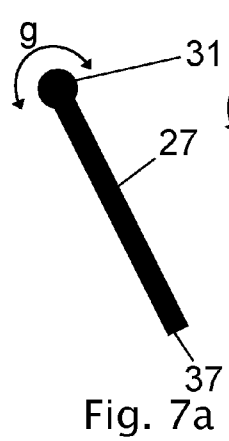
FIGS. 7a to 7d show cross-sectional views of various embodiments of the mixing flap.
Figure 7B:
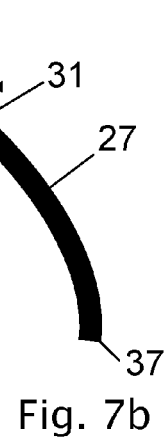
Figure 7C:
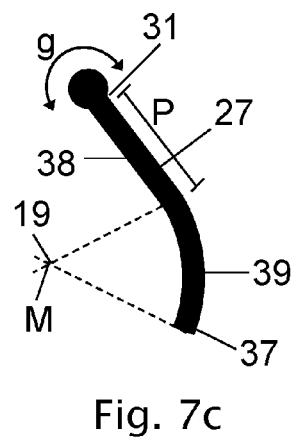
Figure 7D:
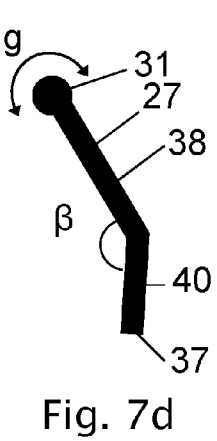

It will be appreciated that the shape of the mixing flap 27 can be varied. Different cross-sectional variations of the mixing flap 27 are indicated in FIGS. 7a to 7d, while the size ratios in FIGS. 7a to 7d do not correspond to those in FIGS. 1 to 6. With respect to it cross-sectional profile, FIG. 7a corresponds to the mixing flap of FIGS. 2 to 6 and is provided with a planar or linear configuration in the rotational plane of the milling rotor 12. Alternatively, the mixing flap 27 can also be adapted in the shape of an arc, e.g., as shown in FIG. 7b. The bottom edge 37 of the mixing flap 27 in this embodiment is bent towards the milling rotor 12. The curvature can additionally be adapted, e.g., to the circumferential shape of the milling rotor 12. Alternatively, segmented configurations of the mixing flap 27 are possible, as illustrated, for example, in FIGS. 7c and 7d. According to FIG. 7c, an arched segment 39 adjoins a planar or linear part 38 of the length P which is connected to the pivoting axis 31. The arched segment 39 bent towards the milling rotor 12 is configured so that its central point "M" lies approximately coaxially with the bearing axis 19. The arched segment 39 is thus adapted with respect to its curvature to the cylindrical rotational circumference or the cutting circle of the milling rotor 12. Instead of the arched segment 39, it is also possible to arrange a segment 40 that is planar or linear in its cross-section against the linear part 38 which protrudes at an angle ∟ towards the milling rotor 12 beyond the segment 38.

While the present invention has been illustrated by description of various embodiments and while those embodiments have been described in considerable detail, it is not the intention of Applicant to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicants' invention.

What is claimed is:

1. A rotor hood for a milling apparatus for shielding a milling rotor outwards, comprising
a front hood part;
a rear hood part;
two side hood parts,
the front and rear hood parts enclosing together with the two side hood parts a working space that is open at the bottom for receiving the milling rotor;
a stripping device pivotably mounted on the rotor hood which forms the rear lower edge of the rotor hood in the working direction for smoothing the milled ground material;
a mixing flap comprising a solid plate and being mounted on the rear hood part that is movable within an adjustment range into the working space and that is mounted on the rotor hood separately from the stripping device so that it deflects ground material milled by the milling rotor toward the milling rotor during working operation;
wherein the rotor hood comprises an opening which is closeable by the mixing flap and which has an outer contour of the opening being circumferentially formed by the rotor hood so as to define an entirely closed periphery of the opening; and
further wherein the mixing flap is mounted on the rotor hood in such a way that it completely closes off the opening outwards when in a position in which it is maximally pivoted out of the working space.

2. A rotor hood according to claim 1,
wherein the mixing flap is arranged behind the milling rotor and in front of the stripping device in relation to the stream of milled ground material.

3. A rotor hood according to claim 1,
wherein an adjustment limit is provided that limits at least an adjustment movement into the working space and/or an adjustment movement out of the working space of the mixing flap.

4. A rotor hood according to claim 3,
wherein the adjustment limit comprises an inside stop, against which the mixing flap strikes in an adjustment movement out of the working space.

5. A rotor hood according to claim 1,
wherein the mixing flap is mounted on the rotor hood in such a way that, in a position in which it is pivoted maximally out of the working space, the mixing flap closes off an opening provided in the rotor hood outwards.

6. A rotor hood according to claim 5,
wherein the opening extends over a working width of the milling apparatus.

7. A rotor hood according to claim 1,
wherein the mixing flap is configured as one piece.

8. A rotor hood according to claim 1,
wherein the mixing flap extends over an entire working width of the milling apparatus.

9. A rotor hood according to claim 1,
wherein the mixing flap is continuously adjustable.

10. A rotor hood according to claim 1,
wherein a drive device is provided which is adapted to drive an adjustment of the mixing flap.

11. A construction machine comprising a rotor hood according to claim 1.

12. A method for operating a milling apparatus with a rotor hood according to claim 1, comprising controlling a mixing operation and/or a degree of milling by way of an adjustment of the mixing flap within the working space of the rotor hood.

13. A method for operating a milling apparatus according to claim 12, comprising individually controlling adjusting positions of the mixing flap and the stripping device that is mounted and adjustable independently of the mixing flap.

14. A construction machine according to claim 11, wherein the construction machine comprises a recycler.

15. A construction machine according to claim 11, wherein the construction machine comprises a stabilizer.

16. A construction machine according to claim 11, wherein the construction machine comprises a milling machine.

* * * * *